(12) United States Patent
Ryznar et al.

(10) Patent No.: US 11,592,799 B2
(45) Date of Patent: *Feb. 28, 2023

(54) DISTRIBUTED PRODUCTION METHOD

(71) Applicant: LightGuide, Inc., Wixom, MI (US)

(72) Inventors: Paul Ryznar, Northville, MI (US); William T. Sommerville, Wixom, MI (US)

(73) Assignee: LightGuide, Inc., Wixom, MI (US)

( * ) Notice: Subject to any disclaimer, the term of this patent is extended or adjusted under 35 U.S.C. 154(b) by 116 days.

This patent is subject to a terminal disclaimer.

(21) Appl. No.: 17/235,556

(22) Filed: Apr. 20, 2021

(65) Prior Publication Data

US 2021/0240155 A1 Aug. 5, 2021

Related U.S. Application Data

(63) Continuation of application No. 16/180,375, filed on Nov. 5, 2018, now Pat. No. 10,983,500.

(60) Provisional application No. 62/581,196, filed on Nov. 3, 2017.

(51) Int. Cl.
| | |
|---|---|
| *G05B 19/406* | (2006.01) |
| *G06Q 50/04* | (2012.01) |
| *G06Q 10/083* | (2023.01) |
| *G06Q 30/08* | (2012.01) |

(52) U.S. Cl.
CPC ......... *G05B 19/406* (2013.01); *G06Q 10/083* (2013.01); *G06Q 30/08* (2013.01); *G06Q 50/04* (2013.01); *G05B 2219/32222* (2013.01)

(58) Field of Classification Search
CPC ........ G05B 19/406; G05B 2219/32222; G05B 2219/31041; G05B 19/41835; G05B 2219/32022; G06Q 10/083; G06Q 30/08; G06Q 50/04; G06Q 10/06311; Y02P 90/30; Y02P 90/02
See application file for complete search history.

(56) References Cited

U.S. PATENT DOCUMENTS

| | | |
|---|---|---|
| 2001/0032111 A1 | 10/2001 | Jensen, Jr. et al. |
| 2005/0225753 A1 | 10/2005 | Engelbart et al. |
| 2009/0158577 A1 | 6/2009 | Schweikle |
| 2012/0095925 A1 | 4/2012 | Agarwal et al. |
| 2015/0052025 A1 | 2/2015 | Apsley |

(Continued)

OTHER PUBLICATIONS

International Search Report and Written Opinion completed Mar. 7, 2019, from corresponding International Application No. PCT/IB2018/058682.

*Primary Examiner* — Mohammad Ali
*Assistant Examiner* — Sheela Rao
(74) *Attorney, Agent, or Firm* — Gardner, Linn, Burkhart & Ondersma LLP

(57) ABSTRACT

A distributed light-guided processing method includes obtaining an order from a requester, for at least one completed product. Raw components are provided to at least one selected remote processing location. The selected remote processing location includes a light guided system. Work instructions are provided to the selected remote processing location, wherein the work instructions enable the light guided system to guide construction of the completed product. The completed product is processed, using at least the raw components, the work instructions, and the light guided system. The completed product is shipped from the selected remote processing location upon completion of the processing.

16 Claims, 6 Drawing Sheets

(56) References Cited

U.S. PATENT DOCUMENTS

| | | |
|---|---|---|
| 2017/0080561 A1 | 3/2017 | Meier |
| 2017/0255186 A1 | 9/2017 | Ryznar et al. |

PRIOR ART
PRE-ASSEMBLE
FIG. 1A
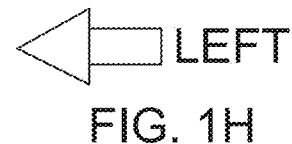
FIG. 1H
SELECT
FIG. 1B
FIG. 1I
INSERT
FIG. 1C
ASSEMBLE
FIG. 1D
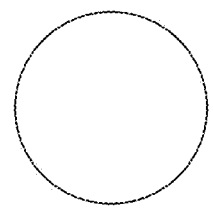
FIG. 1J
PICK
FIG. 1E
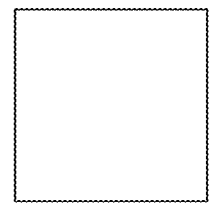
FIG. 1K
GUAGE
FIG. 1F
TORQUE
FIG. 1G
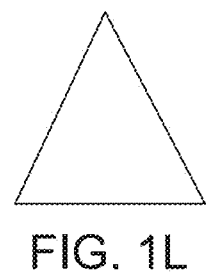
FIG. 1L

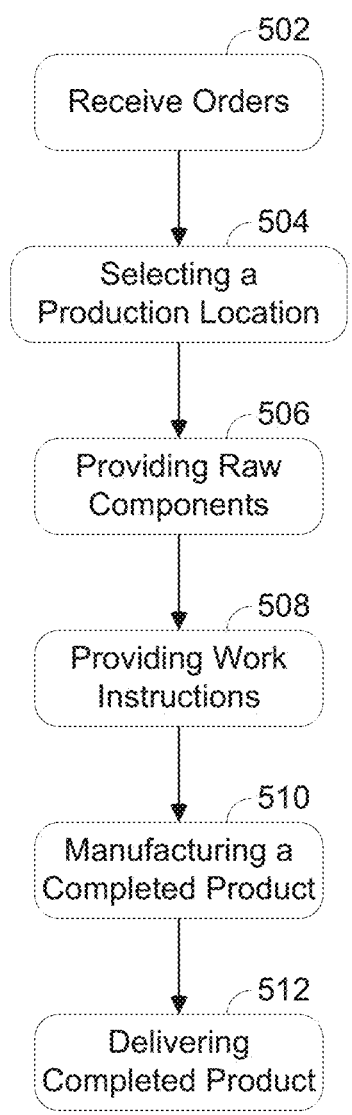

DISTRIBUTED PRODUCTION METHOD

CROSS REFERENCE TO RELATED APPLICATION

The present application is a continuation of U.S. application Ser. No. 16/180,375, filed Nov. 5, 2018, now U.S. Pat. No. 10,983,500 B2 and claims priority of U.S. provisional application Ser. No. 62/581,196, filed Nov. 3, 2017, which are hereby incorporated herein by reference in their entireties.

FIELD OF THE INVENTION

The present invention is directed to a method for conducting process operations, and in particular a method for distributing industrial operations such as manufacturing, assembly, inspection, or part kitting to remote light-guided processing locations.

BACKGROUND OF THE INVENTION

Light guided systems make use of augmented reality in order to visually and audibly guide users through the assembly, inspection, kitting, or training involved in manual processes while also recording and transmitting a wide variety of analytics. Employees of factories, hospitals, and many other work environments typically travel to a physical employment location to perform their work. Such a practice increases expenses and time spent for users and increases traffic congestion and emissions.

SUMMARY OF THE INVENTION

The present invention provides a distributed processing system and a method for distributing the assembly, inspection, part kitting, and/or training requirements (hereinafter referred to as distributed processing) of various products to at least one remote production location which today typically occurs in a centralized factory, warehouse, hospital, and/or other work locations. Each remote production location includes at least one light guided work station configured to guide a manufacturing process.

According to an aspect of the present invention, a method for distributing processing includes obtaining, from a customer, at least one order for at least one completed product. The order may be obtained via the Internet by a cloud computing service. Raw components are provided to at least one remote location, wherein each remote location includes a light guided system. The method includes providing work instructions to each remote location and manufacturing, using at least the raw components, the work instructions, and the light guided system, at least one completed product. The work instructions may be provided to the light guide system via the Internet by the cloud service. The completed product is delivered to the customer. Data and analytics may be gathered and analyzed from each step in order to increase quality and/or productivity, or for training purposes.

According to a further aspect of the present invention, a distributed processing or manufacturing system includes a plurality of remote production locations, a cloud computing service, and a production coordinator. Each of the remote production locations includes at least one light guided work station. The cloud computing service is configured to receive orders for completed products from customers and to send the orders and associated work instructions to at least one of the plurality of remote production locations. The production coordinator is configured to coordinate, via the cloud computing service, the sending of the orders and work instructions to the plurality of remote production locations, and further configured to coordinate the delivery of raw components to the plurality of remote production locations. Each light guided work station is configured to guide a manufacturing process using at least the raw components and the work instructions to produce completed products.

In an aspect of the present invention, the ordered product includes at least one of an assembled product, a product inspection, product kitting, and product manufacturing training. Each of the plurality of remote production locations is also configured to review the completed products for errors and to report the errors to the production coordinator.

In a further aspect of the present invention, the production coordinator is configured to coordinate the delivery of the completed products to the customers. The production coordinator is further configured to coordinate the delivery of the raw components and the work instructions based upon the orders received from the customers. The production coordinator is also configured to send a first order to a first remote production location of the plurality of remote production locations based at least in part on a quantity of raw components already present at the first remote production location.

In another aspect of the present invention, the processing comprises an inspection such that a completed product is an inspected product. The raw components comprise any of an individual item, assemblies or items, and subassemblies provided for inspection.

These and other objects, advantages, purposes and features of this invention will become apparent upon review of the following specification in conjunction with the drawings.

BRIEF DESCRIPTION OF THE DRAWINGS

FIGS. 1A-1L illustrate exemplary images that may be projected by the light sources of the assembly guide system of FIG. 1;

FIG. 5 is a flow diagram illustrating the steps to a method for distributing manufacturing in accordance with the present invention.

DESCRIPTION OF THE PREFERRED EMBODIMENTS

Figure 3:
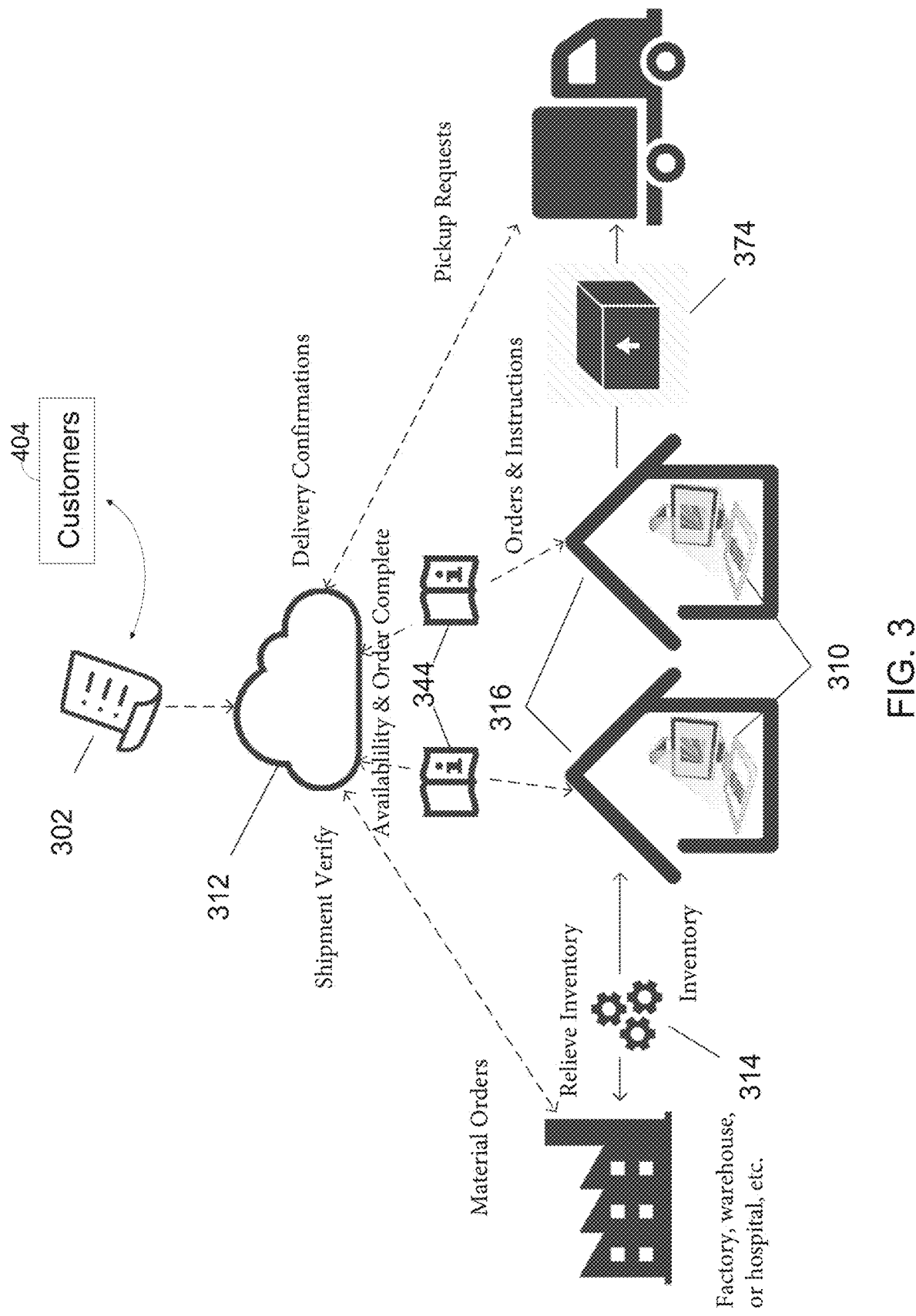
FIG. 3 is a block diagram illustrating an exemplary distributed light guided production system in accordance with the present invention.

Referring now to the drawings and the illustrative embodiments depicted therein, a method for distributing light-guided manufacturing includes obtaining, from a customer, at least one order for the completion of at least one completed product. As shown in FIG. 3, an order 302 may be provided to a particular remote producer or remote location, hereinafter referred to as a remote production or processing location 316, via the cloud computing service 312 based on that remote production location's confirmation that it is available for an order 302 at that time. The raw materials or components 314 may be ordered via the cloud computing service 312. The raw components 314 are provided to at least one remote production location 316. The components 314 may be provided, via delivery, from a factory, store, warehouse, or the like. The delivery may occur by any manner of transport, including, but not limited to, automobile, truck or drone. Raw components 314 may be delivered prior to obtaining an order such that the remote production location 316 is stocked with inventory for the completion of a number of different products. Alternatively, delivery of raw components 314 may be in response to obtaining the order 302 or assignment of order 302 to a remote production location 316. Excess raw materials or components 314 at a remote production location 316 may also be returned to relieve the accumulated inventory at the remote production location 316. This allows for precise delivery of the exact type and quantity of raw components necessary to complete the order. As discussed herein, the order 302 may include any one or more of an order for assembly, inspection, kitting, and training.

Each remote production location 316 includes a light guided system, or light guided work station 310, which in the illustrated embodiment comprises a LIGHT GUIDE SYSTEMS PRO or LIGHT GUIDE SYSTEMS STRATUS provided by OPS Solutions LLC of Wixom, Mich. Alternatively, the remote production locations 316 may use a combination of devices such as computer and projector, a phone and projector, a CHROMEBIT and a projector, or an INTEL COMPUTE STICK. Such devices may be integrated with a webcam or other device including, but not limited to, an ORBBEC PERSEE, MICROSOFT KINECT, OR BASLER TOF 3D camera.

Methods and systems of the present invention provide for distributed light-guided production via a light guided work station, such as the operational guide system disclosed in U.S. Pat. No. 7,515,981, issued on Apr. 7, 2009 (hereinafter the '981 patent), which is hereby incorporated herein by reference. As discussed herein, the light guided work stations 310 are typically an "augmented reality" tool that includes a projector to display images on the remote production location 316, and guides and directs the user using audio and visual prompts. Such a system helps to reduce errors, improve manufacturing, assembly, and inspection processes, and decrease training necessary for the users.

Figure 1:
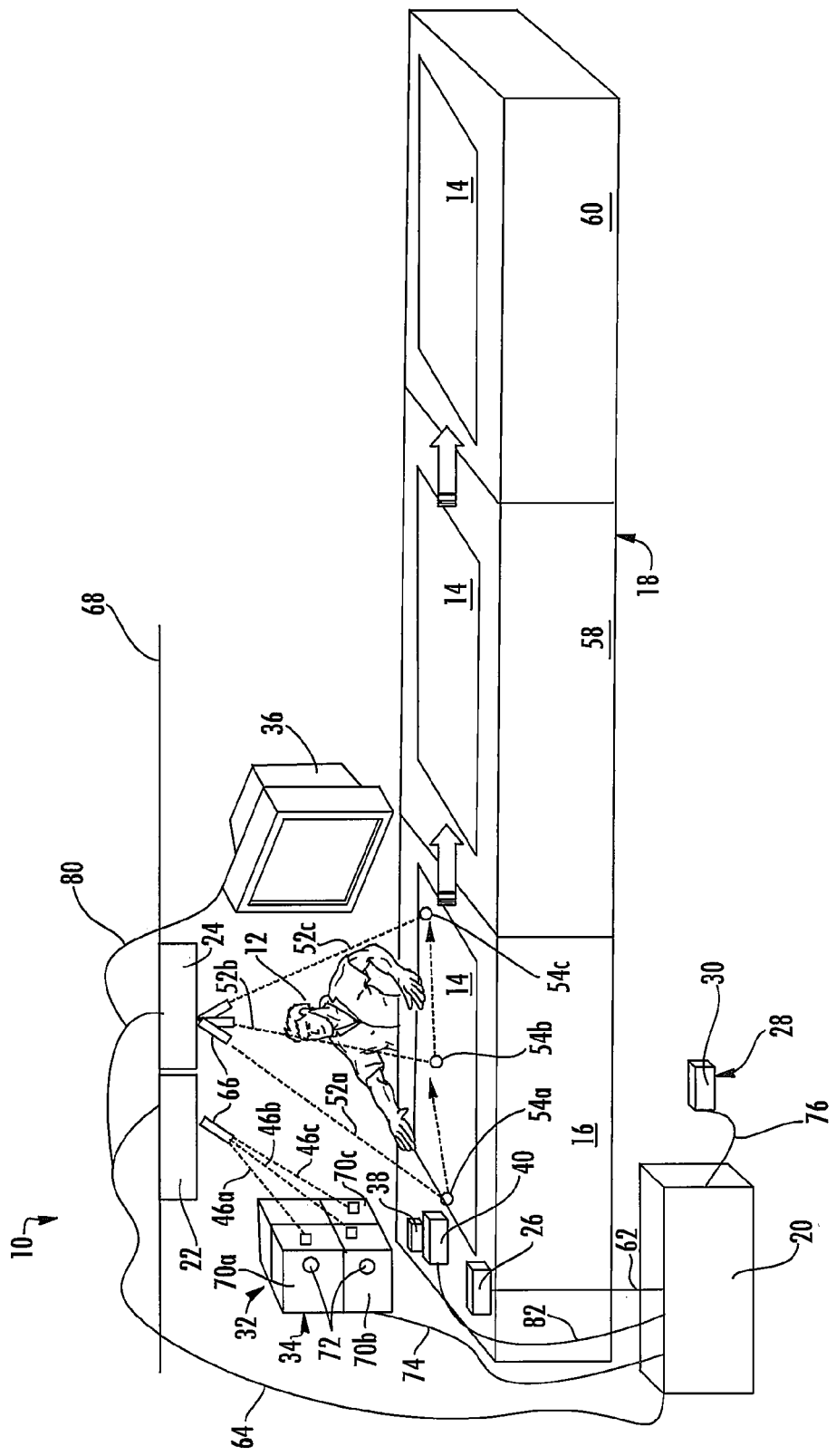
FIG. 1 is a perspective view of an operational guide system constructed as an assembly guide system at a work station.
Figure 2:
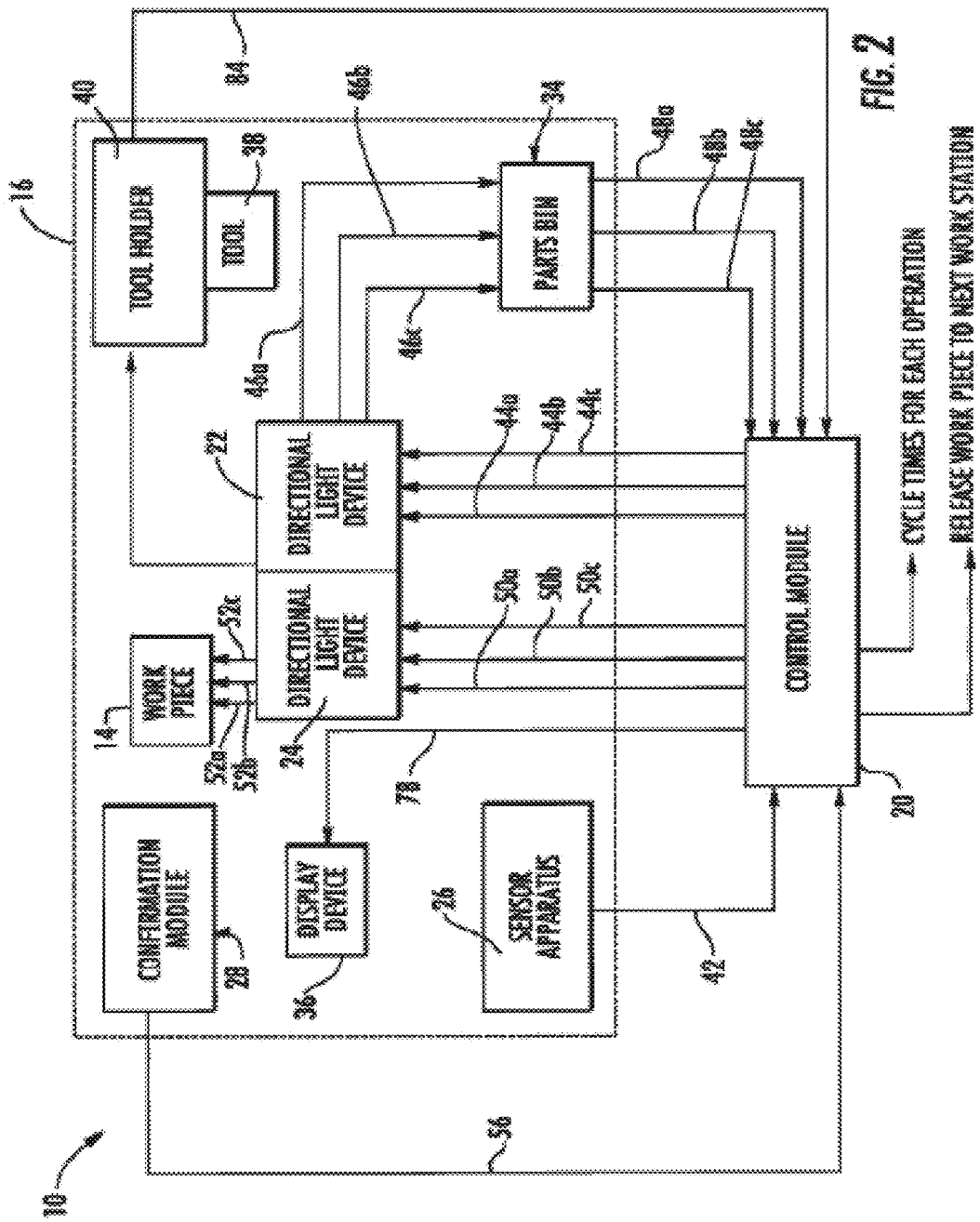
FIG. 2 is a schematic illustration of the operation of the assembly guide system of FIG. 1.

With reference to FIGS. 1-2, the '981 patent discloses an light guided system or light guided work station 10 in connection with providing of visual indicators to an operator 12 performing one or more actions (e.g., assembly, inspection, kitting, and training) on a work piece 14 at a work station 16 of an assembly line 18. The illustrated guide system 10 includes a controller or a control module 20, two directional light devices 22, 24, a sensor apparatus 26, and a confirmation module or device or element 28, shown as a foot pedal 30. Guide system 10 includes a component location 32, which is illustrated as a parts bin 34, a display device 36, and a tool 38, and tool holder 40.

Guide system 10 is operable, in response to an operation information or characteristic or identification information associated with work piece 14 detected by sensor apparatus 26, to selectively provide indicating lights 46, 52 to guide an operator in the selection and/or assembly of parts to work piece 14, with the indicating lights 46, 52 being directed and/or provided based on, at least in part, the operation information detected by sensor apparatus 26. The guide system 10 is also or alternatively operable in response to one or more confirmation signals, such as confirmation signals 48, 56, and/or 84 of FIG. 2 that are described below, which may be manually or automatically supplied to control module 20 to verify completion of a particular operation or task. The system 10 is further operable via display device 36 to provide and relay information to operator 12 such as, for example, a listing of steps needing completion, work instructions, images of a work piece, videos, and/or warnings regarding a missed or improperly performed assembly step.

Referring to FIGS. 1 and 2, when the work piece 14 initially enters the work station 16, the sensor apparatus 26 detects an operation information or characteristic or identification information associated with the work piece 14, such as, for example, the presence of and/or the type of work piece 14 present at the work station 16. In response to the detection by sensor apparatus 26, a first input signal 42 is communicated or transmitted to the control module 20 and, based on the detected or identified work piece 14 that the operator 12 is or will be working on, the control module 20 communicates or transmits a command signal 44 (FIG. 2) to directional light device 22 to project an indicating light 46 at a location on parts bin 34 to guide the operator 12 to a part required for a particular step in the assembly action. After the proper part has been selected, a confirmation signal 48 (FIG. 2) is sent to the control module 20, the control module 20 then transmits a command signal 50 (FIG. 2) to directional light device 24 to project indicating light 52 to indicate the operational step location 54 on the work piece 14 where the selected component is to be installed. Upon completion of a particular operation step, the operator 12 may actuate the foot pedal 30, or other device, to transmit a confirmation signal 56 (FIG. 2) to the control module 20 verifying that the operation step has been completed. The control module 20 may then send another command signal 49, 50 to one of the directional light devices 22, 24 to indicate the next operation step, or may indicate that the operations are completed for that part if all required pick and assembly steps have been properly completed. The system may additionally or alternatively include sensors for automatically detecting that an operational step has been completed, which may involve detecting that an operational step has been completed properly. This may include, for example, cameras or other sensors for detecting completion of an operation.

The guide system 10 is able to provide visual indicators to the operator 12 that are specific to a particular work piece 14, such that, for example, multiple different styles or types of work pieces requiring different components or parts may be processed at the work station 16 with a significant reduction in the risk of the occurrence of assembly errors. The assembly guide system 10 thus provides a cost effective and accurate method of guiding an operator 12 through a series of tasks and provides confirmation that the tasks have been fully accomplished and completed in the proper order. The control module 20 may also be used to monitor cycle times of the individual operational steps and combined operations undertaken at the work station 16 for system productivity reporting, or the like.

The guide system 10 is shown in FIG. 1 in connection with work station 16, where work station 16 is part of an assembly line 18 that includes additional work stations 58, 60 for performing subsequent operations. Additional assembly guide systems could be included at the other work stations of assembly line, or a single assembly guide system could be used to aid operations at more than one work station.

As noted, the sensor apparatus 26 functions to detect an operation information or characteristic or identification information associated with the work piece 14, such as the presence and/or type of the work piece 14 located at the work station 16, and may be constructed as one or more of a number of known sensors such as, for example, a proximity switch, light curtain, photo eye, radio frequency identifier device, bar code reader, or the like. When constructed as a radio frequency identifier device or bar code reader, a readable tag or bar code may be placed on either the work piece or the structure upon which the work piece is supported while traveling on the assembly line. The tag or bar code may contain information regarding the type of work piece at the work station 16, such as the model of the work piece, measurements related to the work piece, or the type of components required. A scanner or reader may be handheld by the operator or mounted to the assembly line, with the scanner being able to read the information from the tag or bar code when the work piece 14 enters the work station 16. Alternatively, a sensor apparatus 26 may comprise a vision system configured to detect an identifiable characteristic or identification information associated with a work piece 14. The guide system 10 may alternatively be activated or sequentially stepped to subsequent operations by non-automated signals. For example, an operator 12 may manually enter a part type into the guide system 10, depress a palm button, press a touch screen, or simply commence operations or pre-operations on a part.

The type of part present at a particular work station need not be determined using a bar code or radio frequency system. For example, and as is known in the art, standard binary type sensors or cameras may be used to detect geometrically distinguishing features of a work piece or the structure upon which it is located to "identify" the work piece 14. Still further, a guide system 10 could be constructed where an operator 12 uses a hand held scanner to scan a bar code label affixed to the work piece or the structure supporting the work piece 14 as opposed to the scanner being mounted directly to the assembly line. The sensor apparatus 26 may also be used to detect the relative orientation of a work piece 14 with respect to the work station 16, with the control module adapted to receive the positional information and provide accordingly adjusted command signals to the directional light devices such that the projected indicating lights accurately impinge on the desired operational step locations. Still further, the presence of a part at a work station 16 may be supplied to the operational guide system by a manual operator activated input signal, such as by a touch screen, a palm button, or the like.

The control module 20, in the illustrated embodiment, is a computer controller device and as indicated is adapted to receive and send various signals to monitor and guide the assembly actions at the work station 16. The control module 20 may be constructed as a desktop or laptop style PC, a PLC, or the like, or may be a networked computer system that may be used to control and monitor other aspects of the assembly line and work stations.

As previously indicated, the control module 20 is adapted to receive a first input signal 42 regarding identification information of the work piece 14 present at the work station 16. In the illustrated embodiment of FIG. 1, the first input signal 42 is transmitted to the control module 20 directly from the sensor apparatus 26 along communication link 62, where link 62 is a computer cable, fiber optic line, or the like. Alternatively, however, a first input signal 42 may be transmitted to a network computer system and, in response to the first input signal 42, the network system may provide the control module 20 with the identification information regarding the work piece 14 present at the work station 16. The identification information, as previously indicated, may simply indicate the presence of a part at the work station and/or may include information regarding the type of work piece 14 at the work station 16, such as the model of the work piece, measurements related to the work piece, or the type of components required. Optionally, a sensor apparatus 26 and control module 20 may be alternatively constructed to wirelessly transmit and receive identification information.

In response to the first input signal received, the control module 20 outputs command signals 44, 50 to directional light devices 22, 24 along link 64 to provide visual indicators to the operator 12, as described in more detail below, with the command signals 44, 50 being communicated based on, at least in part, the first input signal 42. In the illustrated embodiment, two substantially similar directional light devices 22, 24 are provided at the work station 16 and are responsive to the command signals 44, 50 of the control module 20. Directional light device 22 is used to project the indicating lights 46 at the component location 32, while the other directional light device 24 is used to project the indicating lights 52 at operational step locations 54 on the work piece 14. Each directional light device 22, 24 includes a light source 66 for projecting indicating lights 46, 52, with the directional light devices 22, 24 constructed such that the indicating lights 46, 52 may be selectively and movably positionable to direct the indicating light 46, 52 at pretargeted locations. The light sources 66 may also be constructed to provide an indicating light beam of selectively adjustable brightness to compensate for ambient surroundings and/or the distance from the light source to the selected impingement point. Although light sources 66 are illustrated in FIG. 1 as projecting a single indicating light beam, it should also be appreciated that light sources 66 may be constructed to simultaneously project two or more beams such that, for example, multiple parts may be indicated for selection from location 32 by the operator 12 or multiple assembly locations may be indicated.

The light sources 66 may be constructed as laser light sources that are able to project a focused, coherent beam of light at a desired location. Laser light sources may preferably be class 3 or lower lasers for employment within a visual setting for operators. Alternatively, light sources other than lasers may be used and still function as intended, such as standard projectors, incandescent lights, light emitting diodes (LEDs), or the like.

Light sources 66 may be constructed such that they produce light of differing color from each other to provide further visual cues to the operator 12 while working at work station 16. Furthermore, light sources may be adapted to project animated images or videos onto a surface, such as a surface of the work piece 14, assembly line 18, or a work station 16, 58, 60. The projected animated images or videos may be, for example, a training video, and may be in an .mpeg, .wmv, or other such file format provided by or stored in, for example, a control module of an operational guide system.

Referring to FIGS. 1A-1L, the directional light devices 22, 24 may also include known optical effect devices for fanning or adapting or configuring the projected indicating lights 46, 52 produced by the light sources 66 into a desired shape, pattern, or form at the point or location at which the indicating light 46, 52 impinges the component location 32 or operational step location 54. For example, the indicating light may initially be projected as a geometric shape (FIGS. 1J-1L), such as a circle, about a particular location to quickly attract the operator's attention, and then focus to a point or circle of smaller diameter at the specific location. The indicating light may also be projected to produce alpha numeric characters, such as shown in FIGS. 1A-1I, blink, and/or produce rotating images. For example, sequential numbers may be projected where each number indicates a step in the assembly action being performed by the operator at the work station, or part numbers or textual information may be projected to provide written guidance to the operator. Indicating lights projected by light sources, as described in more detail below, may further be configured to display videos or pictures or animation on the surface upon which the indicating light impinges. The configured images form a type of display graphic or visual display feature ("VDF") exhibited by an indicating light, such as indicating light 46 or 52, when projected onto a surface, with FIGS. 1A-1L representing exemplary display graphics or VDFs.

As previously noted, indicating lights 46, 52 may be projected at component location 32 or at operation step locations 54 associated with the work piece 14. The component location 32 is exemplified as a parts bin 34 having multiple storage locations 70 for holding various parts required in the assembly of work pieces 14. As shown, directional light device 22 is functional to selectively project an indicating light 46 at discrete storage locations 70 of parts bin 34 in response to command signal 44 to prompt the operator 12 regarding part selection.

RFID tags, or the like, may also be used to supply information to the control module 20. For example, an RFID tag located on a parts bin 34 may be used in connection with the guide system 10 for monitoring the presence and/or proper location of the parts bin 34. In the event the guide system 10 detected, such as by the control module 20, the absence of the parts bin 34, an error message could be, for example, displayed by display device 36, or projected by a light device 22, 24, or an audible warning message may be broadcast.

In the illustrated embodiment of FIG. 1, storage locations 70 of the parts bin 34 include detection devices 72 that are intended to detect or sense when a component has been withdrawn from a particular storage location 70. The detection devices 72 may be of known construction and are selected based on a particular application, taking into consideration the types or models of work pieces 14 and parts to be assembled. The detection devices 72, for example, may comprise light curtains, proximity sensors, electronic mats, such as pressure sensitive mats, machine vision systems, or the like.

The detection devices 72 are operable to transmit a confirmation signal 48 to the control module 20 along link 74 upon selection by the operator 12 of a part from a particular storage location 70, with the control module 20 being functional to determine whether or not the operator 12 has selected the correct part as prompted. In response to the confirmation signal 48, if the operator 12 selected the proper part as directed by the indicating light 46, the control module 20 may terminate the indicating light 46 projecting from the directional light device 22 at the storage location 70 and transmit a subsequent command signal 50 to the directional light device 24 to project an indicating light 52 to the operational step location 54 on the work piece 14 where the just selected part is to be assembled. However, if the control module 20 determines that an incorrect part has been selected as compared to what should have been selected as prompted by the indicating light 46, the control module 20 will not provide the subsequent command signal 50. In addition, the control module 20 may be constructed to provide a visual or audible signal to the operator 12 when an improper part has been selected from a storage location 70.

Although not illustrated, the parts bin 34 may additionally employ a known pick-to-light system whereby each storage location includes an illumination device, such as an LED light or the like, that lights up to prompt the operator as to the proper storage location from where a part is to be selected. When the guide system 10 includes such a pick-to-light system, the directional light device 24 used to project an indicating light 46 at a component location 32 may optionally be excluded.

As noted above, the guide system 10 includes a confirmation module 28, which in the illustrated embodiment is a foot pedal 30. The confirmation module 28 is constructed to transmit a confirmation signal 56 along the link 76 to the control module 20 to signal that the operational step indicated by the directional light device 22 or 24 has been completed. To transmit the confirmation signal 56, the operator 12 simply depresses the foot pedal 30 upon completion of the directed activity. The confirmation signal 56 transmitted by the foot pedal 30 then triggers the control module 20 to selectively transmit another command signal 44, 50 to provide guidance to the operator 12 regarding the subsequent operational step that must be taken by the operator 12 at the work station 16 in accordance with work piece 14. For example, the guide system 10 may cause an indicating light 46 to be projected at a storage location 70 for the next required part. Alternatively, the control module 20 may provide a command signal that releases the work piece to the next work station 58 if all of the operational steps at the current work station 16 have been completed.

Although illustrated as a foot pedal 30, it should be understood that numerous alternative confirmation modules 28 may be utilized. For example, the confirmation module 28 may be constructed as a pressure sensitive mat, push button, toggle switch, palm button, light curtain, touch screen, touch pad, part present sensor or the like, which is constructed to be depressed, switched, or otherwise activated by a manual action of the operator 12. A sound activated signal may alternatively be employed, such as a voice command, to provide a confirmation signal. The confirmation module 28 may also be constructed as a wireless transmitter, thereby eliminating the need for a physical link. Further, the guide system 10 may be adapted to receive and/or respond to other confirmation signals and/or sources as additional technologies become available.

Still further, a confirmation module or device or element may be constructed to automatically detect when an operator has completed a manual step. For example, a confirmation module may be constructed as a vision system that is able to detect the presence or absence of a component at a location, such as by processing an image captured by a pixilated imaging device, as is known in the art. Alternatively; for example, the confirmation module may be constructed as a proximity sensor, photo eye, light curtain, or the like, constructed to automatically detect the presence or absence of a part upon assembly to the work piece. Still further, a confirmation signal may be transmitted by an automated tool or measuring device, such as a torque gun, weight scale or other type of measuring device, as described in more detail below. In which case, the automated tool or measuring device may function as a confirmation module. An indicating light projected by a light source of an operational guide system may also be used to provide a confirmation signal where, for example, a sensor is employed at the light source or elsewhere on the operational guide system to detect the reflection of an indicating light from a part or component that requires verification. The light sources may also be used as a "light curtain" by being projected at a particular location or parts bin, or the like, with a sensor adapted to detect that an operator has properly selected from that location.

It should also be appreciated that an operation information could be transmitted to the controller 20 from a remote signal. For example, in the case of a part kitting operation, an order request may be transmitted to a work station 16 from a central processing location, such as a computer system or the like, and transmit a signal to the work station 16 regarding, for example, what parts to gather and/or assemble. In which case, the work piece of the operation may comprise a collection of parts assembled into a parts holder.

Although not illustrated, the guide system 10 may also incorporate known ultrasonic, electromagnetic, and/or similar technology used to confirm, for example, that a tool is placed onto the proper bolt or nut at an assembly operation. Such technology is configured to send and receive ultrasonic frequencies with the spatial location of a sent or received signal being monitored to confirm that an operation is performed at a proper location. Thus, the guide system 10 may be configured to utilize both light sources and ultrasonic, electromagnetic, and or similar technology to confirm assembly or other manual process steps.

The guide system 10 also includes a display device 36 that is able to receive display signals 78 (FIG. 2) along link 80 (FIG. 1) from the control module 20 and to relay information to the operator 12. The display device 36 may be constructed as a television, LCD, LED device, or other type of viewable display mechanism. The display device 36 may be used to present information to the operator 12, such as, for example, the sequential steps needing to be performed, work instructions associated with the work station 16, images of a work piece 14 properly affixed with the part that is to be assembled, information regarding a missed or improperly performed assembly step, or the like. In the case of sequential steps, the display device 36 may be configured to highlight the current step under consideration and/or provide an indication that previous steps have been completed. The display device 36 may be constructed as a touch screen device adapted to be depressed by an operator to provide a confirmation signal regarding completion of a particular step. The inclusion of such a touch screen device may also provide the ability to prompt or guide an operator through certain operational or assembly steps that do not require guidance via indicating light signals. The display device may also be used to show or provide instructional videos, display running cycle times, desired cycle times, and/or alerts, or the like. In the case of a touch screen, the touching by an operator of a particular location or tab area of the screen may display of a video or an image on the display screen, or another display screen, or may initiate the projection of an indicating light or video.

Optionally, the guide system 10 maybe used in connection with a tool 38 and a tool holder 40. The tool 38 may comprise, for example, a manual tool, such as a wrench, torque wrench, pliers, screwdriver, or the like, or may be an automated tool, such as an electric screwdriver, air gun, electric torque wrench, or the like. The tool 38 may otherwise be a manual or automated measuring device, such as calipers, a gauge block, feeler gauges, air gauge device, or the like. The tool holder 40 is intended to provide a storage location for the tool 38 when the tool 38 is not in use. The directional light devices 22, 24 may project an indicating light onto the tool 38 and/or the tool holder 40 in response to a command signal when the tool 38 is required to complete a pending operational step, such as in a similar manner as described above with respect to the storage locations 70 of the parts bin 34 and the operation step locations 54 on the work piece 14. The tool holder 40 may include a sensor and thereby be integrated with the guide system 10 to detect when the tool 38 is positioned within or removed from the tool holder 40, where the sensor may be a photo eye, proximity switch, light curtain, or the like.

Although not illustrated, the guide system 10 may utilize an automated gauge or tool that is electrically linked to a control module such that the control module is able to monitor both the use of the tool as well as an operational parameter associated with the tool. For example, if a tool is constructed as a torque wrench, the control module may be constructed to monitor the fastening torque obtained by the torque wrench and to compare the value to a preprogrammed or predetermined or threshold value prior to transmitting a subsequent command signal. The control thus may function to transmit the subsequent command signal only after the desired or appropriate torque has been applied by the torque wrench. Similarly, if the tool is constructed as a measuring device, such as digital calipers, the control module may be constructed to receive a measurement value, and may compare the measurement value to a threshold measurement value, and may communicate or transmit the subsequent command signal when the measurement value is at or near the threshold measurement value.

The control module 20 is illustrated as transmitting a command signal 44a to the directional light device 22, which in response to the command signal 44a, projects the indicating light 46a on the storage location 70a of the parts bin 34. Upon receiving the confirmation signal 48a from the detection device 72 signifying that the proper part was selected, the control module 20 then terminates projection of the indicating light 46a and transmits the command signal 50a to the directional light device 24 such that the indicating light 52a is projected on the operational step location 54a on the work piece 14 to direct the operator 12 as to the proper assembly point for the selected part. The operator 12 then activates the foot pedal 30 (or other confirmation device), which transmits the confirmation signal 56a to the control module 20 and the above process is repeated for the indicating lights 46b, 52b, 46c, 52c, the storage locations 70b, 70c, and the operational step locations 54b, 54c.

Figure 4:
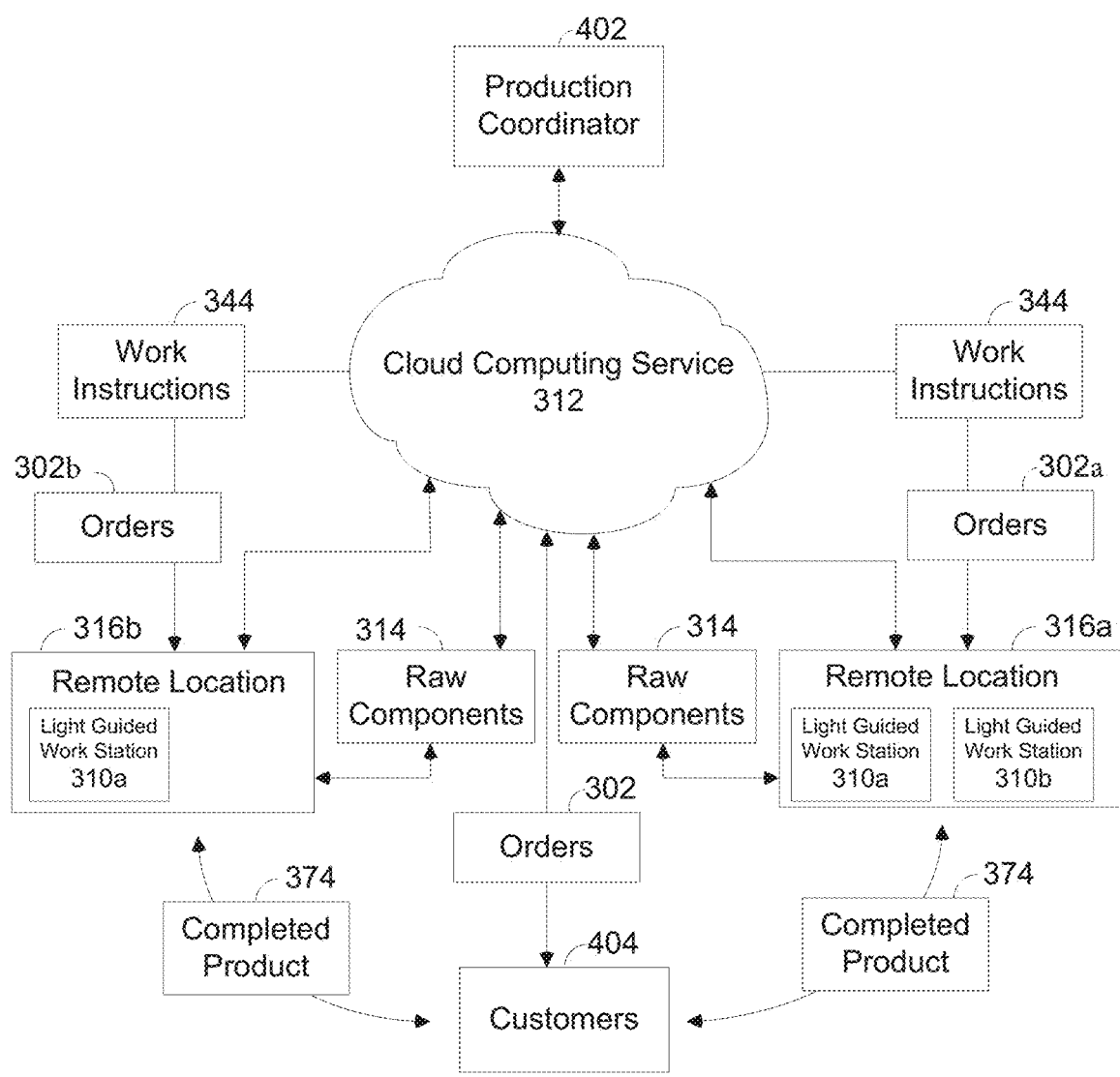
FIG. 4 is a block diagram illustrating an exemplary distributed light guided production system in accordance with the present invention.

As illustrated in FIGS. 3 and 4, in the light guided systems or light guided work stations of the present invention, it is appreciated that there may be any number of remote processing locations 316a, 316b, each with one or more light guided work stations 310a, 310b, and each provided with raw components 314 from a factory, warehouse, hospital, or restaurant, etc., or components for inspection may be provided to the remote processing locations 316a, 316b. The raw components 314 may be components provided for such inspection, where such components provided for inspection include complete assemblies, sub-assemblies, and combinations thereof.

The remote processing locations 316a, 316b may be located anywhere capable of supporting a light guided work station 310, such as, for example, the user's home, garage, or other suitable property, or even a contracting processing location. The remote processing locations 316 may also include one or more light guided work stations 310. The production coordinator 402, via the cloud computing service 312, may select an appropriate number of remote processing locations 316a, 316b to ensure adequate completion to satisfy the order. Alternatively, the production coordinator 402 may instead select an order 302 from a list of available orders (via the cloud computing service 312). Such a method allows for flexible schedules and workloads by the operators of the light guided work stations 310 (at the remote processing locations 316). As discussed above, the light guided work stations 310 are typically an "augmented reality" tool that includes a projector to display images on the remote processing location 316, and guide and direct the user/operator using audio and visual prompts. Such a system helps to reduce errors, improve manufacturing, assembly, and inspection processes, and decrease training necessary for the users.

Each remote processing location 316a, 316b is provided with work instructions 344. These work instructions 344 may be provided via the Internet from the cloud computing service 312. While instructions 344 for a wide variety of potential products may be provided prior to obtaining an order 310, ideally the work instructions 344 are provided in response to obtaining an order 302. These work instructions 344 are tailored to allow the light guided systems/work stations 310 to instruct the user/operator 12 to complete the specific completed product 374 desired. Using at least the raw components 314, the light guided work station 310, and the work instructions 344, at least one completed product 374 is completed by the user of the remote production location 316. Any defects detected during completion may be reported back to the cloud computing service 312 (and the production coordinator 402) for appropriate analysis by other parties including, but not limited to, the original producer of the product, end customers 404, or data analytics companies for machine learning or artificial intelligence purposes. The completed product 374 can then be delivered to the requesting customer 404 through any appropriate means. For example, a conventional delivery service may schedule a time to pick up completed products from the remote processing location 316. The production coordinator 402 may schedule the delivery service when the order 310 is assigned to the remote processing location 316 based upon the quantity and/or complexity of the completed product 374. Delivery times may be optimized by choosing remote processing locations 316 that live near the requesting end customer 404 to complete the completed product 374 and either deliver the product themselves or utilize a third party local carrier.

In this way, each user of the light guided systems/work stations 310 can complete products without the need to travel to a typical employment location. Any number of products could be assembled, inspected, kitting, gauged, or otherwise completed per the projected work instructions 344, including manufactured products, hospital produces, textiles and foodstuffs. Perishable foods, such as sushi or meats, could be processed near the requested customers 404, thereby reducing spoilage, or in isolated areas that typically do not have access to such goods. Further, this method allows for highly customized products, or associated processes, to be easily completed, such as a personalized birthday cake, custom floral arrangements, or even specialty pizzas.

FIGS. 4 and 5 also illustrate the lines of communication that exist between the customers 404, the production coordinator 402, the remote production locations 316, raw component suppliers, and pickup services via network connections to the cloud computing service 312 (i.e., the Internet). Such communications are able to confirm that orders 302 have been received, as well as confirming when those orders 302 have been completed (and the completed product 374 picked up for delivery to the requesting customer 404). Similarly, communications exist between the suppliers of the raw component suppliers and the remote processing locations 316, such that the inventory of raw components 314 may be managed. This includes sending and receiving orders for the delivery of raw components 314 as well as managing the removal of excessive inventory as needed. In addition to receiving orders 302 from customers 404 and passing those orders 302 (and necessary work instructions 344) to particular remote processing locations 316, the remote processing locations 316 are also configured to supply the production coordinator 402 with their individual status, order completion indications, as well as their individual availability. In a similar fashion, the delivery services are configured to receive pickup orders from the remote processing locations 316, as well as from the production coordinator 402 (via the cloud computing service 312). Delivery confirmation of the completed product 374 to the requesting customer 404 is also possible.

FIG. 5 illustrates an exemplary method for distributed processing. As illustrated in FIG. 5, in step 502, orders 302 are received from one or more requesting customers 404. The orders 302 may include one or more of product assembly, production inspection, product kitting, and product processing training. In step 504, the orders 302a, 302b are sent to a selected remote processing location 316a, 316b. The selection of a particular remote processing location 316 may be based on one or more criteria. For example, a remote processing location 316 may be selected because of the raw components 314 that are present at that remote production location 316. The remote production location 316 may be selected based on a cost to provide the completed product 374, as reported by that remote processing location 316. Other criteria may also be used to make that selection.

In step 506, raw components 314 are provided to the selected remote processing location 316. These raw components 314 may be provided based upon the orders 302a, 302b sent to the selected remote processing location 316a, 316b. In step 508, associated work instructions 344 are also provided to the selected remote processing location 316, such that the selected remote processing location 316a, 316b is able to fulfil the orders 302a, 302b and produce the completed product(s) 374.

In step 510, the selected remote processing location 316 performs and completes the order 302 to produce a completed product 374. As discussed herein, the order 302 is completed with the use of one or more light guided systems or work stations 310. In step 512, the completed product 374 is delivered to the requesting customer 404. As also discussed herein, the completed product 374 may be delivered to the customer 404 in a variety of ways with the use of a scheduled delivery service or through a specific request for pick and delivery of the completed product 374 to the customer 404. The completed product 374 may also be delivered as requested by the customer 404.

The method illustrated in FIG. 5 may also be adapted to repair or remanufacture goods already produced. It may be further expanded by including the use of three-dimensional (3D) printers and collaborative robots. The collaborative robots could be further used to provide remote assistance. The light guided system may include sensors to track the remote producer. Sensors such as heart rate sensors, blood pressure monitors, eye trackers, or accelerometers may be used to gauge remote producer engagement, stress, attention, focus, or other responses to work instructions or to the product that they are manufacturing.

Further, the methods of the present invention may reduce the costs of employment to the user or operator 12, as a particular user may be able to spend less on fuel, automobile maintenance, daycare, etc. Further, embodiments of the present invention allow for a flexible and balanced work force that can easily complete products across a variety of conditions, geographical locations, and time zones. Each remote processing location 316 with one or more light guided work stations 310 may be shared by a number of users or operators 12. For example, an exemplary remote processing location 316 could be found in a location near a neighborhood, such that members of that neighborhood could make use of the remote processing location 316 (and the associated light guided work stations 310) at all hours of the day or with multiple users at a time. Traffic congestion and emissions from traffic are thereby reduced. Companies may realize additional cost savings through savings in their Cost of Goods Sold (COGS) and other expenses such as taxes, property purchases and/or leases and reduction in necessary benefits. Further, results from this method may be used to confer educational credits, certifications, or other titles that have lasting value to the remote producer.

The method also allows for the capture of logistical data concerning the delivery of raw components and work instructions, and the completion of the products. Such data can be analyzed to further improve quality, productivity, and training and may include full video, audio, and sensor data of the remote processing locations and light guided systems. The method may include real-time analysis of the operation to better understand exactly how a defective part was completed incorrectly. The data may only be transmitted in the event of a defective product arriving at the requesting end customer 404.

Orders 302 from a customer 404 may be transmitted to a physical production coordinator 402 or virtual production coordinator 402 by using artificial intelligence and/or machine learning, with the production coordinator 402 in turn coordinating the processing through the remote processing locations 316. For example, the remote processing locations 316 may be registered through the production coordinator 402, with the production coordinator 402 maintaining information regarding the remote processing locations 316, such as the raw materials 314 present at the remote processing locations 316, the qualifications, ability, availability, and/or authorization of the remote processing locations 316 to perform particular operations. The production coordinator 402 may in turn facilitate the providing of raw materials/components 314 to the remote processing locations 316, as well as the shipping of completed products 374 produced by the remote processing locations 316, where shipping may entail receiving notifications from the remote processing locations 316 regarding the availability of completed products 374, sending transportation to retrieve the completed products 374, and delivering the completed products 374 to a customer, warehouse or other location for use or further processing. The production coordinator 402 will also include a computing device configured to receive and transmit orders, such as via the Internet. In this manner, the production coordinator 402 may facilitate the receipt of orders 302 from a plurality of customers 404, including for numerous different goods and products to be completed (374). Still further, the customer 404 and/or production coordinator 402 may post the availability of orders 302 to a plurality of remote processing locations 316, with the remote processing locations 316 bidding on the orders 302—such as with regard to cost, timing and number of completed products 374 that may be completed by a remote processing location 316.

Live remote assistance may be provided to the remote processing locations 316 via an integrated camera and audio system, the integrated projector, a phone system, and the like. The assistance may be provided by either the physical or virtual production coordinator 402, a WIKI, or by another remote assistant device and/or person. Further, remote processing locations 316 may update, optimize, and store work instructions for parts that require rework or improvements, or alternative steps may be discovered. For example, remote processing locations 316 may find ways to reduce waste, scrap, byproducts, or other undesirable aspects of the process. Remote processing locations 316 may upload the updated work instructions 344 to the production coordinator 402 through the cloud computing service 312. These updated work instructions 344 could then be shared with other remote processing locations 316 or analyzed for further improvements. In this way, improvements and optimization of work instructions 344 may be distributed among all remote processing locations 316. Optimized work instructions 344 could then be implemented elsewhere, such as at a traditional factory. Similarly, remote processing locations 316 may discover improvements or optimizations of the assembled products that are completed 374, and may share these improvements in a similar fashion.

Accordingly, the method for distributed processing, utilizing the distributed light guiding systems 310 of the present invention, provides a means for users of the light guided work stations 310 in remote processing locations 316 to fulfill orders 302 by processing completed products 374 and then delivering the completed products 374 to the customer 404. A customer 404 provides an order 302 to a production coordinator 402 via a cloud computing service 312 and the production coordinator 402 facilitates the delivery of raw components 314 to selected remote processing locations 316 with light guided system/work stations 310 and the ability to complete the request orders 302. The production coordinator 402 also provides each remote processing location 316 with work instructions 344 for the specific completed product 374 (as requested by the particular order 302a, 302b). Using the light guided systems/work stations 310, work instructions 344, and raw components 314, the completed products 374 are completed at each remote processing location 316. The completed products 374 are then delivered to the ordering customer 404. Such a method and system provide high quality, productivity, and training effectiveness while reducing part completion costs, traffic congestion and environmental emissions.

Changes and modifications in the specifically-described embodiments may be carried out without departing from the principles of the present invention, which is intended to be limited only by the scope of the appended claims as interpreted according to the principles of patent law including the doctrine of equivalents.

The invention claimed is:

1. A method for distributive processing, the method comprising:
   informing one or more remote processing locations of an available order to be filled, wherein each remote processing location comprises a light guided system;
   receiving from one or more of the remote processing locations responses to the said informing of the available order;
   selecting one or more of the remote processing locations that responded to perform operations using the light guided system at the selected remote processing location and providing notification to the selected one or more of the remote processing locations of the selection;

providing materials on which the operations are to be performed at each of the said selected one or more remote processing locations;

providing work instructions at each of the said selected one or more remote processing locations, wherein the work instructions enable a light guided system of the selected remote processing location to guide an individual to perform the operations on the materials by operational steps;

wherein the operations to be performed comprise providing one or more of a product for the order in which the product requires processing, and wherein said providing materials on which the operations are to be performed at each of the said selected one or more remote processing locations comprises providing raw components for processing into the product at the selected remote processing location; and wherein the work instructions provided at each of the said selected one or more remote processing locations enable the light guided system of the selected remote processing location to guide an individual processing the raw components into the product by operational steps.

2. The method of claim 1, further comprising performing the operations by an individual on the materials using the light guided system and work instructions at one or more of the selected one or more remote processing locations.

3. The method of claim 2, further comprising shipping the materials from each of said selected one or more remote processing locations after completion of the operations.

4. The method of claim 2, wherein analytics are captured at each of the said selected one or more remote processing locations during said performing the operations by an individual on the materials using the light guided system and work instructions, and wherein said analytics are transmitted to a remote computing device.

5. The method of claim 1, wherein said informing the one or more remote processing locations of the available order to be filled comprises informing by a production coordinator the one or more remote processing locations of an available order to be filled.

6. The method of claim 5, wherein said production coordinator comprises a computing device configured to receive and transmit orders.

7. The method of claim 1, wherein said receiving from the one or more of the remote processing locations responses to the said informing of the available order comprises receiving by a production coordinator.

8. The method of claim 7, wherein said production coordinator comprises a computing device configured to receive and transmit orders.

9. The method of claim 1, wherein the responses of said receiving from one or more of the remote processing locations responses to the said informing of the available order comprises a cost estimate or cost bid provided from the particular remote processing location.

10. The method of claim 1, wherein said selecting one or more of the remote processing locations that responded to perform operations comprises selecting at least one remote processing location based upon at least one of: a quantity of materials already present at a particular remote processing location; an ability, availability, and/or authorization of the particular remote processing location to perform particular operations.

11. The method of claim 1, wherein said providing notification comprises said providing materials and/or said providing work instructions.

12. The method of claim 1, wherein said providing materials occurs after said selecting one or more of the remote processing locations that responded to perform operations.

13. The method of claim 1, wherein said providing work instructions occurs after said selecting one or more of the remote processing locations that responded to perform operations.

14. The method of claim 1, wherein said informing one or more remote processing locations of the available order to be filled and said receiving from one or more of the remote processing locations responses to the said informing of the available order are provided via an Internet connection.

15. The method of claim 14, wherein said providing notification to the selected one or more of the remote processing locations of the selection occurs via an Internet connection.

16. The method of claim 1, wherein the responses of said receiving from one or more of the remote processing locations responses to the said informing of the available order comprises a time estimate or time commitment provided from the particular remote processing location.

* * * * *